US012646781B2

(12) United States Patent
Chi et al.

(10) Patent No.: US 12,646,781 B2
(45) Date of Patent: Jun. 2, 2026

(54) BATTERY PACK HAVING STRUCTURE CAPABLE OF SWELLING CONTROL AND VEHICLE INCLUDING THE BATTERY PACK

(71) Applicant: LG ENERGY SOLUTION, LTD., Seoul (KR)

(72) Inventors: Ho-June Chi, Daejeon (KR); Jeong-O Mun, Daejeon (KR); Kyung-Woo Kim, Daejeon (KR); Jin-Yong Park, Daejeon (KR); Jhin-Ha Park, Daejeon (KR); Hee-Jun Jin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/031,407

(22) PCT Filed: Nov. 12, 2021

(86) PCT No.: PCT/KR2021/016580
§ 371 (c)(1),
(2) Date: Apr. 12, 2023

(87) PCT Pub. No.: WO2022/103212
PCT Pub. Date: May 19, 2022

(65) Prior Publication Data
US 2023/0378584 A1 Nov. 23, 2023

(30) Foreign Application Priority Data
Nov. 13, 2020 (KR) ........................ 10-2020-0152314

(51) Int. Cl.
H01M 50/242 (2021.01)
H01M 50/211 (2021.01)
(Continued)

(52) U.S. Cl.
CPC ....... H01M 50/242 (2021.01); H01M 50/211 (2021.01); H01M 50/258 (2021.01);
(Continued)

(58) Field of Classification Search
CPC ...... B60K 1/04; H01M 50/147; H01M 50/15; H01M 50/166; H01M 50/209; H01M 50/271; H01M 50/281; H01M 50/289
See application file for complete search history.

(56) References Cited

U.S. PATENT DOCUMENTS

2012/0251872 A1 10/2012 Kim
2014/0370364 A1 12/2014 Kim et al.
(Continued)

FOREIGN PATENT DOCUMENTS

CN 202601732 U 12/2012
CN 109713175 A 5/2019
(Continued)

OTHER PUBLICATIONS

Nakamoto et al., JP-2018129240 Machine Translation (Year: 2018).*
(Continued)

*Primary Examiner* — Ula C Ruddock
*Assistant Examiner* — Anna Korovina
(74) *Attorney, Agent, or Firm* — Birch, Stewart, Kolasch & Birch, LLP

(57) ABSTRACT
A battery pack includes a plurality of battery modules; a pack tray in which the plurality of battery modules are accommodated; a module cover covering an opening portion formed over the pack tray; a pack cover covering the module cover; and an upper elastic member located between the module cover and the pack cover and compressed, when the module cover moves toward the pack cover due to swelling of the battery module, to absorb volume expansion due to the swelling.

16 Claims, 6 Drawing Sheets

(51) Int. Cl.
    *H01M 50/258*      (2021.01)
    *H01M 50/262*      (2021.01)
    *H01M 50/271*      (2021.01)

(52) U.S. Cl.
    CPC ....... *H01M 50/262* (2021.01); *H01M 50/271*
         (2021.01); *H01M 2220/20* (2013.01)

(56)          References Cited

U.S. PATENT DOCUMENTS

| | | | |
|---|---|---|---|
| 2016/0172724 A1* | 6/2016 | Berger | H01M 10/613 |
| | | | 429/120 |
| 2016/0218388 A1* | 7/2016 | Kim | H01M 10/4257 |
| 2017/0305249 A1* | 10/2017 | Hara | B62D 25/2036 |
| 2017/0373289 A1 | 12/2017 | Lee et al. | |
| 2018/0062127 A1 | 3/2018 | Lee et al. | |
| 2018/0175437 A1* | 6/2018 | Amagai | H01M 10/0481 |
| 2018/0287111 A1 | 10/2018 | Fukuoka et al. | |
| 2018/0287227 A1* | 10/2018 | Jeong | B60L 58/25 |
| 2018/0316070 A1 | 11/2018 | Lee et al. | |
| 2018/0337376 A1 | 11/2018 | Jin et al. | |
| 2019/0001838 A1 | 1/2019 | Choi et al. | |
| 2019/0148688 A1 | 5/2019 | Kellner et al. | |
| 2019/0181405 A1* | 6/2019 | Kim | H01M 10/6556 |
| 2019/0267682 A1 | 8/2019 | Seo et al. | |
| 2020/0028201 A1 | 1/2020 | Ahn | |
| 2020/0127258 A1 | 4/2020 | Lim et al. | |
| 2020/0144570 A1 | 5/2020 | Ju et al. | |
| 2020/0185672 A1 | 6/2020 | Seo et al. | |
| 2021/0013562 A1 | 1/2021 | Sakurai | |
| 2021/0098760 A1* | 4/2021 | Jeon | H01M 10/613 |
| 2021/0135175 A1* | 5/2021 | An | H01M 50/224 |
| 2021/0313635 A1* | 10/2021 | Wang | H01M 10/613 |
| 2021/0344057 A1 | 11/2021 | Seo et al. | |
| 2022/0123427 A1* | 4/2022 | Ren | H01M 50/209 |
| 2022/0140428 A1 | 5/2022 | Chi et al. | |

FOREIGN PATENT DOCUMENTS

| | | | |
|---|---|---|---|
| CN | 110518163 A | 11/2019 | |
| CN | 211252182 U | 8/2020 | |
| CN | 111769221 A | 10/2020 | |
| CN | 211907500 U | 11/2020 | |
| EP | 3 125 332 A1 | 2/2017 | |
| EP | 3 621 128 A1 | 3/2020 | |
| EP | 4 109 646 A1 | 12/2022 | |
| JP | 2004-55346 A | 2/2004 | |
| JP | 2009-170140 A | 7/2009 | |
| JP | 2015-505144 A | 2/2015 | |
| JP | 2018129240 A * | 8/2018 | |
| JP | 2019-21382 A | 2/2019 | |
| JP | 2019-21383 A | 2/2019 | |
| JP | 2019-123355 A | 7/2019 | |
| JP | 2019-536214 A | 12/2019 | |
| KR | 10-2012-0112992 A | 10/2012 | |
| KR | 10-2018-0025643 A | 3/2018 | |
| KR | 10-2018-0114475 A | 10/2018 | |
| KR | 10-2019-0078386 A | 7/2019 | |
| KR | 10-2019-0110349 A | 9/2019 | |
| KR | 10-2061745 B1 | 1/2020 | |
| KR | 10-2088477 B1 | 3/2020 | |
| KR | 10-2094445 B1 | 3/2020 | |
| KR | 10-2020-0044578 A | 4/2020 | |
| KR | 10-2020-0086172 A | 7/2020 | |
| KR | 10-2020-0112246 A | 10/2020 | |
| KR | 10-2172517 B1 | 10/2020 | |
| WO | WO 2013/031613 A1 | 3/2013 | |
| WO | WO 2017/068705 A1 | 4/2017 | |
| WO | WO 2020/145539 A1 | 7/2020 | |
| WO | WO-2021196114 A1 * | 10/2021 | H01M 10/6556 |

OTHER PUBLICATIONS

International Search Report (PCT/ISA/210) issued in PCT/KR2021/016580 mailed on Feb. 14, 2022.

Extended European Search Report for European Application No. 21892379.5, dated May 28, 2024.

U.S. Office Action for U.S. Appl. No. 18/402,467, dated Feb. 28, 2024.

United States Office Action for U.S. Appl. No. 18/402,467, dated Oct. 16, 2024.

U.S. Office Action for U.S. Appl. No. 18/402,467, dated Jun. 20, 2024.

* cited by examiner

BATTERY PACK HAVING STRUCTURE CAPABLE OF SWELLING CONTROL AND VEHICLE INCLUDING THE BATTERY PACK

TECHNICAL FIELD

The present disclosure relates to a battery pack having a structure capable of swelling control and a vehicle including the battery pack, and more particularly, to a battery pack having a structure in which the amount of swelling occurring in a stack direction of a cell stack may be minimized by minimizing a stack thickness of one cell stack and a structure in which a pressure applied to a battery cell is relatively constantly increased as the amount of swelling is increased, and a vehicle including the battery pack.

The present application claims priority to Korean Patent Application No. 10-2020-0152314 filed on Nov. 13, 2020 in the Republic of Korea, the disclosures of which are incorporated herein by reference.

BACKGROUND ART

In general, in order to control swelling of a battery cell, a conventional battery pack has a structure in which a buffer pad is inserted between adjacent battery cells and/or into an outermost portion of a cell stack, a structure in which an empty space is secured by considering volume expansion due to swelling of a battery cell in a pack housing, or a structure in which a pack housing is deformed according to swelling of a battery cell to absorb the swelling.

In the conventional battery pack structure, according to the amount of swelling which is increased as the number of battery cells constituting a cell stack is increased, it is required to secure a larger empty space and/or apply a larger number of buffer pads. Also, in this conventional structure, typically, a stack direction of battery cells is usually parallel to the ground or a bottom surface of a pack housing. This structure is disadvantageous in terms of securing structural rigidity of a battery pack and securing high energy density.

Also, when a buffer pad is used to absorb swelling, as the amount of swelling is increased, the magnitude of a force required to compress the buffer pad is further increased, and thus, a pressure applied to a battery cell is explosively increased.

DISCLOSURE

Technical Problem

The present disclosure is designed to solve the problems of the related art, and therefore the present disclosure is directed to preventing a decrease in energy density due to an empty space for absorbing volume expansion of a battery cell due to swelling, securing structural rigidity of a battery pack, and preventing an explosive increase in a pressure applied to the battery cell as the amount of swelling is increased.

However, the technical purpose to be solved by the present disclosure is not limited to the above, and other objects not mentioned herein will be clearly understood by one of ordinary skill in the art from the following disclosure.

Technical Solution

In one aspect of the present disclosure, there is provided a battery pack including: a plurality of battery modules; a pack tray in which the plurality of battery modules are accommodated; a module cover covering an opening portion formed over the pack tray; a pack cover covering the module cover; and an upper elastic member located between the module cover and the pack cover and compressed, when the module cover moves toward the pack cover due to swelling of at least one battery module of the plurality of battery modules, to absorb volume expansion due to the swelling.

Each battery module of the plurality of battery modules may include: a module tray including a tray base and a tray partition wall extending in a direction perpendicular to the tray base and dividing a seating space on the tray base in a width direction of the tray base; a first cell stack located on the tray base and located on a first side of the tray partition wall; and a second cell stack located on the tray base and located on a second side of the tray partition wall.

The upper elastic member may include: a first upper elastic member located at a position corresponding to the first cell stack; and a second upper elastic member located at a position corresponding to the second cell stack.

Each of the first cell stack and the second cell stack may include a plurality of battery cells stacked in a direction perpendicular to the tray base.

The pack tray may include: a dividing beam configured to divide a receiving space of the pack tray in a width direction of the pack tray; and at least one cross beam configured to divide a space divided by the dividing beam in a longitudinal direction of the pack tray.

The module cover and the pack cover may be fastened to the pack tray by bolts passing through the module cover and the pack cover, and wherein a movement of the module cover according to the swelling is guided by the bolts.

The bolts may include: a first bolt fastened to the at least one cross beam by sequentially passing through the pack cover and the module cover; and a second bolt fastened to the tray partition wall by sequentially passing through the pack cover and the module cover.

The pack cover may include a plurality of cover protrusions protruding from an inner surface of the pack cover, and wherein the first upper elastic member and the second upper elastic member are located between a pair of adjacent cover protrusions of the plurality of cover protrusions.

The pack cover may include a cover receiving groove formed in a top surface of the pack cover so that the first bolt and the second bolt are not exposed above the top surface of the pack cover, wherein the cover receiving groove is formed at a position corresponding to the plurality of cover protrusions.

The battery pack may further include a lower elastic member located between the pack tray and the tray base and compressed, when the tray base moves toward the pack tray due to swelling of the battery module, to absorb volume expansion due to the swelling.

The lower elastic member may include: a first lower elastic member located at a position corresponding to the first cell stack; and a second lower elastic member located at a position corresponding to the second cell stack.

The tray base may be fastened to the tray partition wall by a third bolt passing through the pack tray and the tray base, and wherein a movement of the tray base according to the swelling is guided by the third bolt.

The pack tray may include a tray protrusion protruding from an inner surface of the pack tray, wherein the at least one cross beam is a pair of cross beams, and wherein the first lower elastic member and the second lower elastic member are located between the tray protrusion and one of the pair of cross beams.

The pack tray may include a tray receiving groove formed in a bottom surface of the pack tray so that the third bolt is not exposed below the bottom surface of the pack tray, wherein the tray receiving groove is formed at a position corresponding to the tray protrusion.

In another aspect of the present disclosure, there is also provided a vehicle including the battery pack as described above.

Advantageous Effects

According to an aspect of the present disclosure, a decrease in energy density due to an empty space for absorbing volume expansion of a battery cell due to swelling may be prevented, structural rigidity of a battery pack may be secured, and an explosive increase in a pressure applied to the battery cell as the amount of swelling is increased may be prevented.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
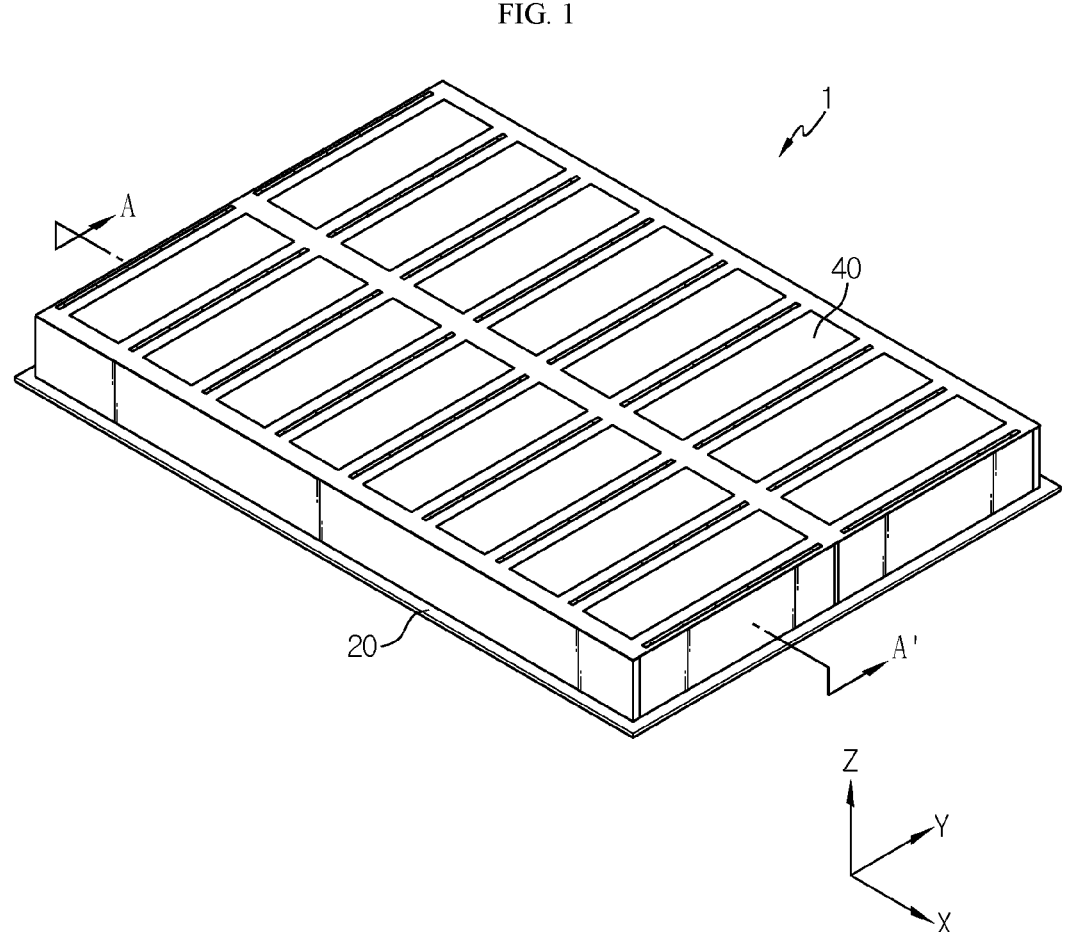
FIG. 1 is a view illustrating a battery pack according to an embodiment of the present disclosure.
Figure 2:
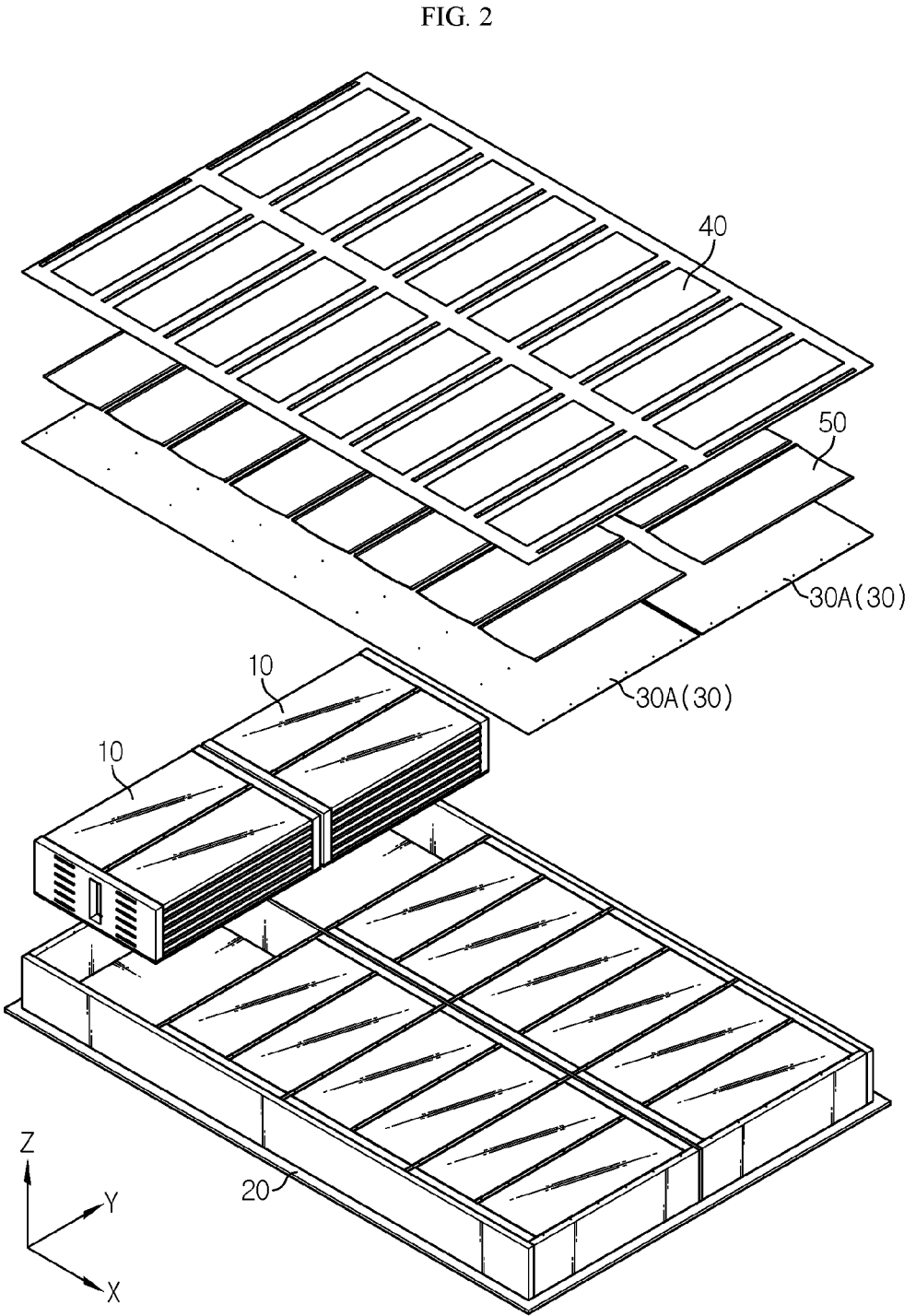
FIG. 2 is an exploded perspective view illustrating the battery pack of FIG. 1.
Figure 3:
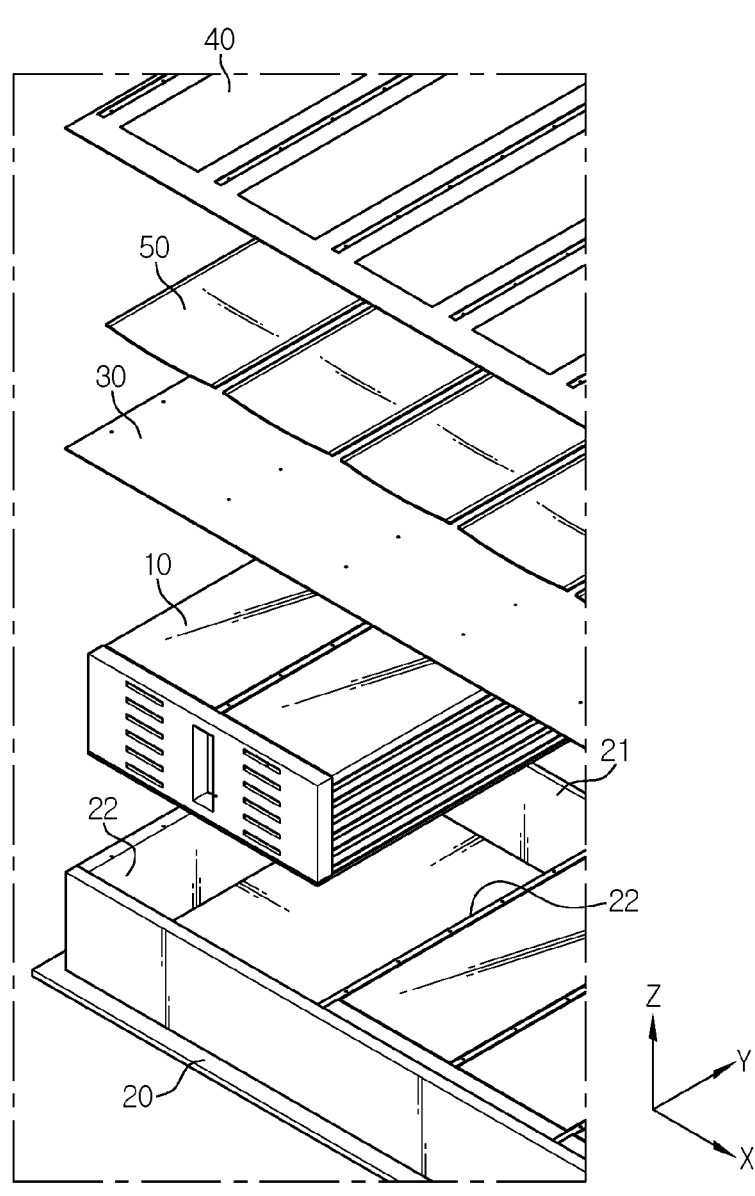
FIG. 3 is a partial enlarged view of FIG. 2.
Figure 4:
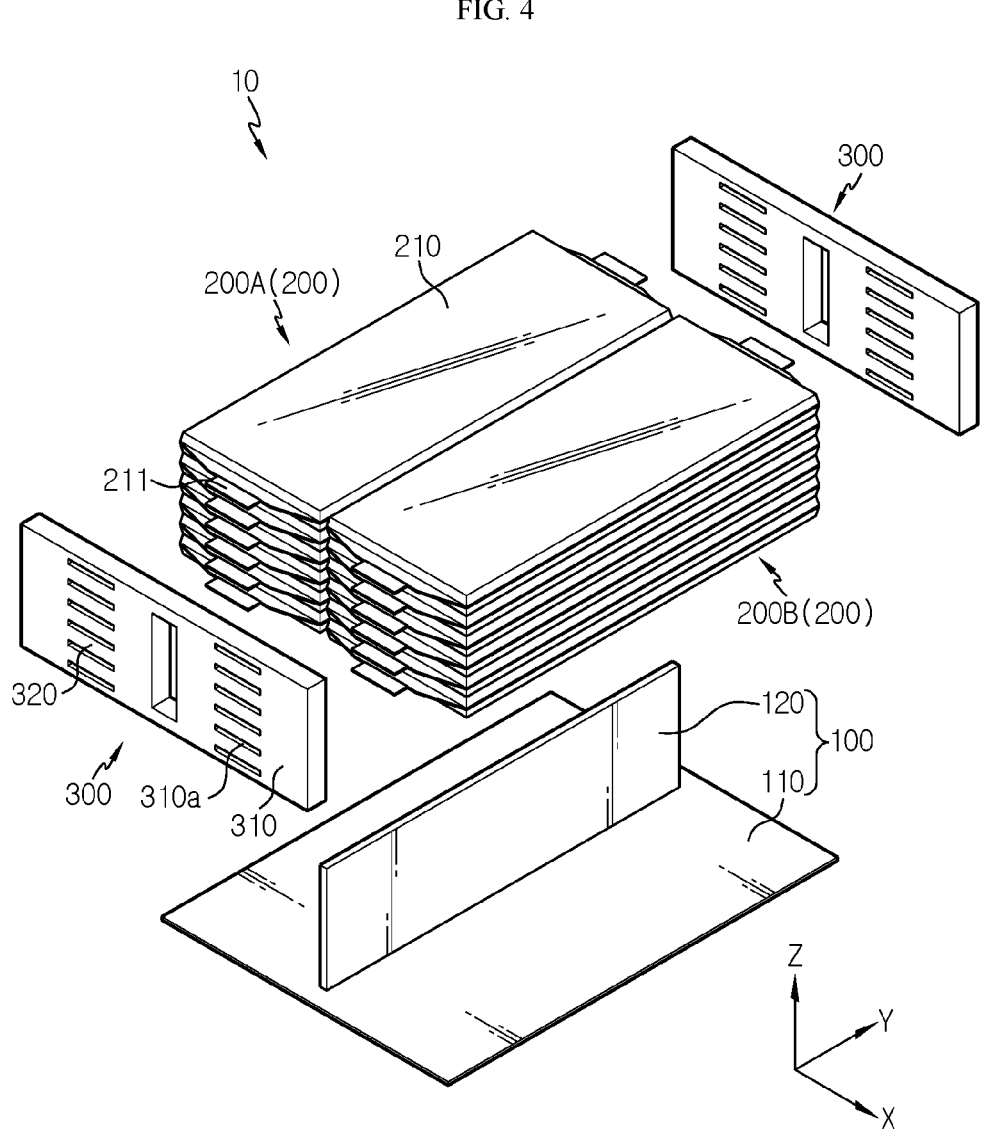
FIG. 4 is a view illustrating a battery module of the present disclosure.
Figure 5:
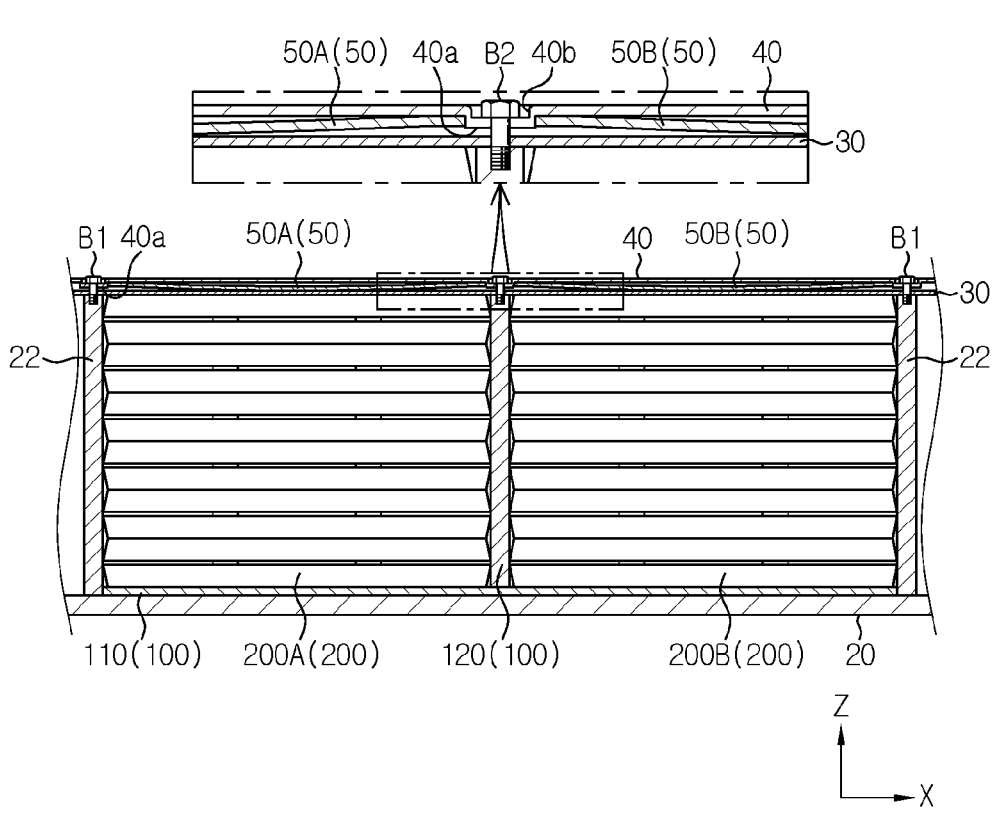
FIGS. 5 and 6 are partial cross-sectional views illustrating a battery pack, taken along line A-A', according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Referring to FIGS. 1 through 5, a battery pack 1 includes a plurality of battery modules 10, a pack tray 20, a module cover 30, a pack cover 40, and an upper elastic member 50.

Each of the plurality of battery modules 10 includes a module tray 100 and a cell stack 200. The battery module 10 may further include a pair of bus bar frame assemblies 300.

The module tray 100 includes a tray base 110 and a tray partition wall 120. The tray base 110 supports the cell stack 200, and is located on an inner bottom surface of the pack tray 20. The tray partition wall 120 extends in a direction perpendicular to the tray base 110, and divides a seating space on the tray base 110 in a width direction (direction parallel to an X-axis) of the tray base 110.

The cell stack 200 is located on the tray base 110. The cell stack 200 includes a first cell stack 200A and a second cell stack 200B. The first cell stack 200A is located on the tray base 110, and is located on a side of the tray partition wall 120. The second cell stack 200B is located on the tray base 110, and is located on the other side of the tray partition wall 120.

Each of the first cell stack 200A and the second cell stack 200B includes a plurality of battery cells 210 stacked in a direction perpendicular to the tray base 110. The battery cell 210 may be a pouch-type battery cell.

The pair of bus bar frame assemblies 300 are coupled to the first cell stack 200A and the second cell stack 200B from a side and the other side of the module tray 100 in a longitudinal direction (direction parallel to a Y-axis) of the module tray 100. That is, the pair of bus bar frame assemblies 300 are respectively coupled to a side and the other side of the first cell stack 200A and the second cell stack 200B in a longitudinal direction (direction parallel to the Y-axis) of the first cell stack 200A and the second cell stack 200B. The pair of bus bar frame assemblies 300 may electrically connect the plurality of battery cells 210.

Each of the pair of bus bar frame assemblies 300 includes a bus bar frame 310 and a bus bar 320. The bus bar frame 310 includes a lead slit 310a through which an electrode lead 211 of the battery cell 210 may be drawn out. The bus bar 320 may be fixed to the bus bar frame 310, and may be coupled by welding or the like to the electrode lead 211 of each of the plurality of battery cells 210.

The pack tray 20 accommodates a plurality of battery modules 10 in a receiving space formed inside the pack tray 20. The pack tray 20 includes a base plate forming the bottom and a side plate forming a side wall. The pack tray 20 includes a dividing beam 21 and a plurality of cross beams 22 for dividing the receiving space inside the pack tray 20 and increasing structural rigidity of the battery pack 1.

The dividing beam 21 divides the receiving space of the battery module 10 formed inside the pack tray 20 in a width direction (direction parallel to the Y-axis) of the pack tray 20. The cross beam 22 divides the space divided by the dividing beam 21 in a longitudinal direction (direction parallel to the X-axis) of the pack tray 20. The cross beam 22 is located between adjacent battery modules 10, and is located between an inner surface of the pack tray 20 and a pair of battery modules 10 located at outermost positions from among the plurality of battery modules 10 in a longitudinal direction (direction parallel to the X-axis) of the battery pack 1. Accordingly, the cross beam 22 is located on a side and the other side of all of the battery modules 10 in a width direction (parallel to the X-axis) of all of the battery modules 10.

The module cover 30 covers an opening portion formed over the pack tray 20, and faces the battery module 10. The pack cover 40 is located over the module cover 30 and covers the module cover 30. The upper elastic member 50 is located between the module cover 30 and the pack cover 40. As the module cover 30 moves toward the pack cover 40 due to swelling of the battery module 10, the upper elastic member 50 is compressed to absorb volume expansion due to the swelling. The module cover 30 may include a first module cover 30A covering the battery modules 10 located on a side of the dividing beam 21 and a second module cover 30B covering the battery modules 10 located on the other side of the dividing beam 21 in the receiving space for the battery module 10 divided by the dividing beam 21. When a plurality of module covers 30A, 30B are provided, because swelling of each of the battery modules 10 accommodated in different spaces may be individually controlled, a uniform pressure may be applied to the plurality of battery modules 10.

The upper elastic member 50 may include a first upper elastic member 50A located at a position corresponding to the first cell stack 200A and a second upper elastic member 50B located at a position corresponding to the second cell stack 200B. As such, the battery pack 1 according to an embodiment of the present disclosure may have a structure in which swelling of each battery module 10 may be individually controlled, and swelling of each of the first cell stack 200A and the second cell stack 200B may be individually controlled.

The module cover 30 and the pack cover 40 are fastened to the pack tray 20 by bolts passing through the module cover 30 and the pack cover 40. A movement of the module cover 30 according to the swelling may be guided by the bolts B. The bolts include a first bolt B1 fastened to the cross beam 22 by sequentially passing through the pack cover 40 and the module cover 30 and a second bolt B2 fastened to the tray partition wall 120 by sequentially passing through the pack cover 40 and the module cover 30 from the top.

The pack cover 40 may include a plurality of cover protrusions 40a protruding from an inner surface of the pack cover 40. In this case, the first upper elastic member 50A and the second upper elastic member 50B may be located between a pair of adjacent cover protrusions 40a, and the cover protrusions 40a may function as stoppers for preventing the first upper elastic member 50A and the second upper elastic member 50B from being separated from given positions. The cover protrusion 40a may longitudinally extend in a width direction (direction parallel to the Y-axis) of the pack cover 40. The first bolt B1 and the second bolt B2 pass through the cover protrusion 40a.

The pack cover 40 may include a cover receiving groove 40b formed in a top surface of the pack cover 40 so that the first bolt B1 and the second bolt B2 are not exposed to the top of the pack cover 40. The cover receiving groove 40b is formed at a position corresponding to the cover protrusion 40a. The first bolt B1 and the second bolt B2 pass through the cover receiving groove 40b.

Figure 6:
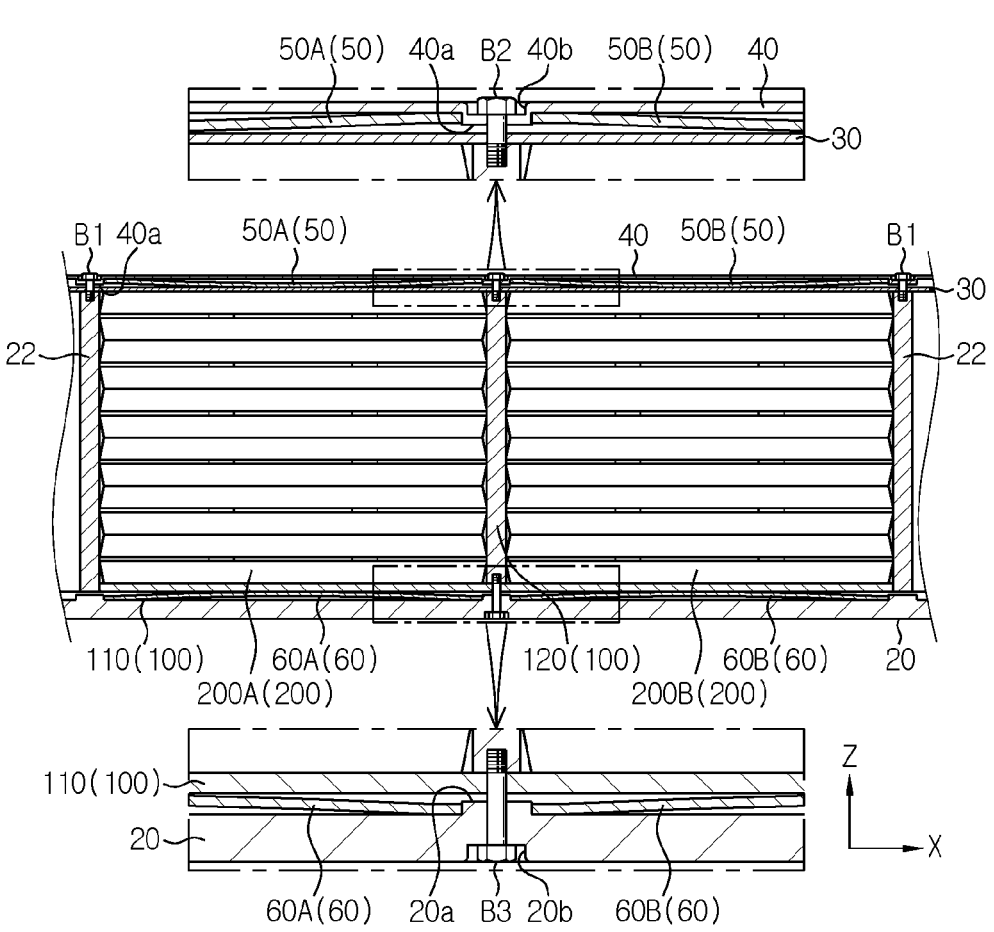

Referring to FIG. 6 together with FIGS. 1 through 4, the battery pack 1 may further include a lower elastic member 60. The lower elastic member 60 is located between the pack tray 20 and the tray base 110. As the tray base 110 moves toward the base plate of the pack tray 20 due to swelling of the battery module 10, the lower elastic member 60 is compressed to absorb volume expansion due to the swelling.

The lower elastic member 60 may include a first lower elastic member 60A located at a position corresponding to the first cell stack 200A and a second lower elastic member 60B located at a position corresponding to the second cell stack 200B.

The tray base 110 is fastened to the tray partition wall by a third bolt B3 passing through the pack tray 20 and the tray base 110. A movement of the tray base 110 according to the swelling may be guided by the third bolt B3.

The pack tray 20 may include a tray protrusion 20a protruding from an inner surface of the base plate of the pack tray 20. In this case, the first lower elastic member 60A and the second lower elastic member 60B are located between the tray protrusion 20a and the cross beam 22 which are adjacent to each other. The tray protrusion 20a and the cross beam 22 may function as stoppers for preventing the first lower elastic member 60A and the second lower elastic member 60B from being separated from given positions. The third bolt B3 passes through the tray protrusion 20a.

The pack tray 20 may include a tray receiving groove 20b formed in a bottom surface of the base plate of the pack tray 20 so that the third bolt B3 is not exposed to the bottom of the base plate of the pack tray 20. The tray receiving groove 20b is formed at a position corresponding to the tray protrusion 20a. The third bolt B3 passes through the tray receiving groove 20b.

For example, a leaf spring or a coil spring may be used as the upper elastic member 50 and the lower elastic member 60. The leaf spring or the coil spring has a more constant increase in a pressure applied to a battery cell when the shape deformation of an elastic member due to swelling is increased, when compared to a conventional buffer pad applied to absorb swelling of a battery cell.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

What is claimed is:

1. A battery pack comprising:
   a plurality of battery modules, each module including:
      a module tray comprising a tray base and a tray partition wall extending in a direction perpendicular to the tray base and dividing a seating space on the tray base in a width direction of the tray base;
      a first cell stack located on the tray base and located on a first side of the tray partition wall; and
      a second cell stack located on the tray base and located on a second side of the tray partition wall;
   a pack tray in which the plurality of battery modules are accommodated, the pack tray comprising a dividing beam configured to divide a receiving space of the pack tray in a width direction of the pack tray;
   a plurality of module covers configured to cover an opening portion formed over the pack tray, the plurality of module covers extending in the width direction of the tray base so as to cross two or more battery modules of the plurality of battery modules;
   a pack cover covering the plurality of module covers; and
   an upper elastic member located between each of the module covers and the pack cover, the upper elastic member being configured to be compressed, when one module cover of the plurality of module covers moves toward the pack cover due to swelling of at least one battery module of the plurality of battery modules, to absorb volume expansion due to the swelling,
   wherein the plurality of battery modules are divided by the dividing beam configured to divide the receiving space of the pack tray in the width direction of the pack tray into a first row of the battery modules and a second row of the battery modules,
   wherein the plurality of module covers comprise a first module cover covering battery modules located on a first side of the dividing beam in the receiving space and a second module cover covering battery modules located on a second side of the dividing beam in the receiving space,
   wherein a number of the plurality of battery modules is greater than a number of the plurality of module covers,
   wherein each of the plurality of module covers is configured such that movement of the each of the plurality of module covers in a direction toward the upper elastic member or in a direction away from the upper elastic member is not constrained by the corresponding tray partition wall, wherein the module covers and the pack cover are fastened to the pack tray by bolts passing through a corresponding module cover of the module covers and the pack cover, and wherein a movement of the corresponding module cover of the plurality of module covers according to the swelling occurs along axes of the bolts.

2. The battery pack of claim 1, wherein the upper elastic member comprises:

a first upper elastic member located at a position corresponding to the first cell stack; and a second upper elastic member located at a position corresponding to the second cell stack.

3. The battery pack of claim 1, wherein each of the first cell stack and the second cell stack comprises a plurality of battery cells stacked in the direction perpendicular to the tray base.

4. The battery pack of claim 2, wherein the pack tray comprises:

at least one cross beam configured to divide a space divided by the dividing beam in a longitudinal direction of the pack tray.

5. The battery pack of claim 4, wherein the bolts comprise:

a first bolt fastened to the at least one cross beam by sequentially passing through the pack cover and the corresponding module cover of the plurality of module covers; and a second bolt fastened to the tray partition wall by sequentially passing through the pack cover and the corresponding module cover of the plurality of module covers.

6. The battery pack of claim 5, wherein the pack cover comprises a plurality of cover protrusions protruding from an inner surface of the pack cover, and wherein the first upper elastic member and the second upper elastic member are located between a pair of adjacent cover protrusions of the plurality of cover protrusions.

7. The battery pack of claim 6, wherein the pack cover comprises a cover receiving groove formed in a top surface of the pack cover so that the first bolt and the second bolt are not exposed above the top surface of the pack cover, and wherein the cover receiving groove is formed at a position corresponding to the plurality of cover protrusions.

8. The battery pack of claim 4, further comprising a lower elastic member located between the pack tray and the tray base and compressed, when the tray base moves toward the pack tray due to swelling of the battery module, to absorb volume expansion due to the swelling.

9. The battery pack of claim 8, wherein the lower elastic member comprises:

a first lower elastic member located at a position corresponding to the first cell stack; and a second lower elastic member located at a position corresponding to the second cell stack.

10. The battery pack of claim 9, wherein the tray base is fastened to the tray partition wall by a third bolt passing through the pack tray and the tray base, and wherein a movement of the tray base according to the swelling is guided by the third bolt.

11. The battery pack of claim 10, wherein the pack tray comprises a tray protrusion protruding from an inner surface of the pack tray, wherein the at least one cross beam is a pair of cross beams, and wherein the first lower elastic member and the second lower elastic member are located between the tray protrusion and one of the pair of cross beams.

12. The battery pack of claim 11, wherein the pack tray comprises a tray receiving groove formed in a bottom surface of the pack tray so that the third bolt is not exposed below the bottom surface of the pack tray, and wherein the tray receiving groove is formed at a position corresponding to the tray protrusion.

13. A vehicle comprising the battery pack according to claim 1.

14. The battery pack of claim 1, wherein each of the plurality of battery modules has an open top, and wherein the plurality of module covers overlies the open top of the plurality of battery modules.

15. The battery pack of claim 1, wherein the first module cover covers all of the battery modules located in the first row of the battery modules and the second module cover covers all of the battery modules located in the second row of the battery modules.

16. The battery pack of claim 15, wherein the dividing beam extends in a first direction, and wherein a length of the first module cover in the first direction is greater than a width of each of the battery modules in the first row of the battery modules.

* * * * *